United States Patent
Kukulya et al.

(10) Patent No.: US 10,303,995 B2
(45) Date of Patent: May 28, 2019

(54) SYSTEM AND METHOD FOR AUTONOMOUS TRACKING AND IMAGING OF A TARGET

(71) Applicant: Woods Hole Oceanographic Institution, Woods Hole, MA (US)

(72) Inventors: Amy L. Kukulya, East Falmouth, MA (US); Thomas Austin, Falmouth, MA (US); Frederic Jaffre, East Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 0 days.

(21) Appl. No.: 15/707,900

(22) Filed: Sep. 18, 2017

(65) Prior Publication Data

US 2018/0082166 A1   Mar. 22, 2018

Related U.S. Application Data

(60) Provisional application No. 62/395,538, filed on Sep. 16, 2016.

(51) Int. Cl.
*G06K 19/06* (2006.01)
*G06K 19/077* (2006.01)
*G06K 19/00* (2006.01)

(52) U.S. Cl.
CPC ....... *G06K 19/07749* (2013.01); *G06K 19/00* (2013.01)

(58) Field of Classification Search
CPC ............ G06K 19/07749; G07F 7/1008; G06Q 20/341

USPC ........................................................ 235/492
See application file for complete search history.

(56) References Cited

U.S. PATENT DOCUMENTS

| 3,722,452 | A | 3/1973 | Wynn, Jr. | |
| 5,331,602 | A | 7/1994 | McLaren | |
| 6,163,503 | A | 12/2000 | Gudbjornsson | |
| 6,332,432 | B1 * | 12/2001 | Marshall | A01K 11/008 119/859 |
| 7,114,286 | B2 * | 10/2006 | Scott | A01K 61/00 43/124 |
| 2004/0220856 | A1 * | 11/2004 | Moore | G06K 19/07758 705/14.23 |

(Continued)

OTHER PUBLICATIONS

Dingle, H., Migration: The Biology of Life on the Move, 1996, pp. 9-39, Oxford Univ. Press, NY, US.

(Continued)

*Primary Examiner* — Ahshik Kim
(74) *Attorney, Agent, or Firm* — Douglas Denninger

(57) ABSTRACT

A submersible tag device configured to operate within a liquid medium, including a liquid-tight housing defining a chamber that remains isolated from the liquid medium when the housing is immersed in the liquid medium, and an attachment mechanism configured to attach to a target selected by a user. A communication module is disposed in the chamber, the module including a receiver, a controller configured to receive input from the receiver, a power source operatively connected to at least the controller, and data storage. When the tag device is immersed in the liquid medium, the receiver is configured to receive a command signal through the liquid medium.

24 Claims, 10 Drawing Sheets

(56) References Cited

U.S. PATENT DOCUMENTS

2015/0289479 A1* 10/2015 Allen .................. A01K 11/006
367/135

OTHER PUBLICATIONS

Block, B.A. et al., Tracking apex marine predator movements in a dynamic ocean, Nature, Jun. 22, 2011, pp. 86-90, vol. 475, Macmillian Pub. Ltd.

Hammerschalg, N. et al., A review of shark satellite tagging studies, J. Exper. Marine Biol. & Ecol., 2010, pp. 1-8, vol. 398, Elsevier B.V.

Benelli, G. et al., RFID Under Water: Technical Issues and Applications, INTECH, 2013, pp. 379-396, Ch. 18, http://dx.doi.org/10.5772/53934.

Skomal, G.B. et al., Subsurface observations of white shark *Carcharodon carcharias* predatory behavior using autonomous underwater vehicle, J. Fish Biology, 2015, pp. 1293-1312, vol. 87, Fisheries Soc. Brit. Isles.

Jepsen et al., The use of external electronic tags on fish: an evaluation of tag retention and tagging effects, Animal Biotelem., 2015, pp. 1-23, 3:49.

Free Dictionary definitions of transceiver, transponder, and responsor, 2018, https://www.thefreedictionary.com/.

* cited by examiner

SYSTEM AND METHOD FOR AUTONOMOUS TRACKING AND IMAGING OF A TARGET

CROSS REFERENCE TO RELATED APPLICATIONS

This application claims priority to U.S. Provisional Application No. 62/395,538 filed on 16 Sep. 2016. The entire contents of the above-mentioned application is incorporated herein by reference.

FIELD OF THE INVENTION

The present invention relates to instrumentation for submerged tracking and monitoring, especially to tracking marine animals and vessels without substantially affecting their performance. More particularly, the invention provides an improved system for tracking large submerged targets in motion, and provides sensing and data transmission capabilities.

BACKGROUND OF THE INVENTION

Continuous, underwater location and orientation tracking is critical for our understanding of submerged objects, especially objects capable of motion. Currently, tags configured to be attached to an aquatic target, such as an animal or boat, allow for only limited location tracking. Investigations of animal habitat use and behavior are important for understanding the ecology of animals and are vital for making informed conservation decisions.

In aquatic environments, it is very difficult to directly observe the behavior of large animals that range widely, such as marine mammals and large pelagic fishes, including sharks, turtles, and dolphins. This is particularly true for feeding behavior because predation events are rarely witnessed. Indeed, much of what is known about the foraging behavior of these animals is derived from a limited number of direct observations in shallow water, from submersible vehicles, and from animal-borne imaging. Given the paucity of such observations, the feeding ecology of large aquatic animals has been inferred from tagging and tracking data, stomach contents, and fatty-acid and stable-isotope analyses. These studies reveal little about actual animal behavior, especially over a period of time and distance.

Similarly, tracking surface or submerged vessels, such as suspected drug traffickers, illegal fishing vessels, enemy submarines, and strategic objects for precise targeting, is of particular importance. For surface vessels, clandestine tracking and monitoring of a target often requires a tag hidden from the crew of the tagged vessel. A tracking tag can be attached below the water line to avoid detection. Currently available tags are not advantageous for submerged tag locations. Satellite tags require an unobstructed link to the satellite, and current underwater acoustic tags have very limited ranges, making a tracking a moving vessel difficult, and potentially detectable by the target.

Furthermore, currently available submergible tags only have transmitting capabilities (e.g. a transmitting pinger for locational information) and no receiving capability. All functions available to the tag, such as tag release, transmission state, or transmission frequency are uncontrollable, and must be preprogrammed.

Historically, electronic tagging data have shown that a variety of large marine predators, including fish, sharks, pinnipeds, whales, marine reptiles, and marine birds, exhibit seasonally recurring migrations in the northeastern Pacific, often between coastal and oceanic habitats. Seasonal migrations often take animals between areas used for foraging and ones used for reproduction. Understanding how a migratory species uses different parts of its range is fundamental to understanding its ecology and life history. There is no way of directly observing and therefore differentiating migratory behaviors such as 'transiting', 'foraging' and 'mating' with current tagging technologies. Instead these behaviors must be inferred from changes in the parameters that are measured (e.g., depth, swim direction, etc.). Further advancements in tagging and subsequent tracking technology are needed for finer scale behavior observation and documentation.

Over the course of the last two decades, new technologies have been developed to track the movements of aquatic targets over multiple spatial and temporal scales. Although these technologies have shown remarkable movements, they do little to reveal what these targets are actually doing. The use of autonomous underwater vehicles (AUVs) has led to the discovery of unique geological, geochemical, and biological phenomena, and to furthering understanding of many important natural processes. Acting as submersible drones, these vehicles can provide data that are virtually impossible to collect with conventional techniques Currently, the small commercial tags available limit spatial tracking and detection to moored receiver locations or to active pinging and recording from a surface vessel, with no informational receiving capability. This limits the usefulness of these tags. Pop-up archival transmitting (PAT) tags are also available, and because they transmit location though the Argos satellite network, they have large operational ranges. But they too lack information receiving capability, and can only transmit information after it is released from the target.

Successive location transmissions for accurate tracking of position are not reliable as a tagged animal may be too far away from a monitoring buoy, or may not reach the surface often enough to provide satellite communication. Depending on the Argos Location Class, satellite data may only be accurate to >1.5 kilometers radius to >100 meters radius such as currently described at http://www.argos-system.org. Furthermore, tagging systems designed for large oceanic animals are often larger in size and rely on large gauge barbed stainless-steel pins to insert the tag securely into the animal's musculature. While these tags may not be harmful on large species, such tags are impractical and potentially deadly to smaller animals or those without sufficient musculature to maintain the tag. Furthermore, relaying positional information for the purpose of actively tracking with an AUV is impractical. Existing acoustic tags have a range of about 500 m and only transmit, limiting active tracking by a tracking vessel. By communicating through the satellite network, satellite tags have no limit to the distance their positional information can be sent, however both the tagged target and the tracking AUV would need to repeatedly surface to receive the tag's location from the satellite network, making tracking unworkable.

A submergible tag that can receive as well as transmit information would greatly improve the field of underwater tracking. A receiving tag, could be used to send commands or additional information pertaining to the mission the tag was deployed in. A receiving tag, or smart tag, could be commanded to change a number of operational procedures, for example, start or stop the tag's transmissions, or change the transmission frequency. A smart tag can be commanded to release from its target, as opposed to the current time-based release, improving tag recovery or preventing the tag from being discovered. With additional components, such a smart tag could perform a wide range of additional actions upon command, for example engage light, turn on additional sensors, activate an underwater drill, or trigger an explosive device.

Therefore, there is a need for a submersible, smart tag with receiving capabilities. The smart tag, as disclosed herein offers on-demand system modification, including transmitting state and frequency, release, and actuation of additional sensors and equipment.

SUMMARY OF THE INVENTION

In general, the present invention describes systems and methods for tagging and tracking a target (e.g., an aquatic animal, a vehicle, a moving object) and modifying the behavior of the tag during tracking. In many embodiments, the systems and methods include the autonomous localization, following, monitoring, tracking, imaging, and data collecting relative to an aquatic target using a system comprising a smart tag and a submersible vehicle.

Disclosed herein is a smart, on-demand tag device, and system and method of using same, to be used for tracking a wide variety of marine targets. The improved design is compatible for many submerged, motile targets, is less disruptive to target behavior and can receive information and commands from a following vehicle while submerged. Furthermore, a tracking system is described comprising one or more underwater vehicles, including autonomous underwater vehicles, the improved tag, and an array of sensors and imaging components to provide autonomous 3-dimensional tracking, monitoring, imaging, and localization of the target of interest.

This invention features a submersible tag device configured to operate within a liquid medium such as fresh- or salt-water, including a liquid-tight housing defining a chamber that remains isolated from the liquid medium when the housing is immersed in the liquid medium, and an attachment mechanism configured to attach to a target selected by a user. The tag device further includes a communication module disposed in the chamber, the module including a receiver, a controller configured to receive input from the receiver, a power source operatively connected to at least the controller, and data storage. When the tag device is immersed in the liquid medium, the receiver is configured to receive a command signal through the liquid medium.

In some embodiments, the communication module further includes a transmitter configured to transmit a data signal through the liquid medium, and the controller is also configured to provide output to the transmitter. In certain embodiments, the attachment mechanism includes an actuator mechanism that is responsive to the controller. In some embodiments, the attachment mechanism includes at least one of an intramuscular mount, an external mount, and a bracket mount. In one embodiment, the actuator mechanism includes a release mechanism that is configured to release the tag device from the target when a release command signal is received by the receiver.

In certain embodiments, the tag device further includes an imaging system. In some embodiments, the tag device further includes a locator system to assist recovery of the tag device when proximate to an upper surface of the liquid medium. In a number of embodiments, the tag device further includes a buoyancy compensation mechanism. In one embodiment, the communication frequency is approximately 10 kHz to 100 kHz.

This invention also features a system for locating a target on or in a liquid medium, including at least a first vehicle configured to travel on or in the liquid medium and configured to send at least one command signal and to receive data signals, and a submersible tag device including (i) a liquid-tight housing defining a chamber that remains isolated from the liquid medium when the housing is immersed in the liquid medium, (ii) an attachment mechanism configured to attach to a target selected by a user, and (iii) a communication module disposed in the chamber, the module including a receiver, a controller configured to receive input from the receiver, a power source operatively connected to at least the controller, and data storage. When the tag device is immersed in the liquid medium, the receiver is configured to receive the at least one command signal through the liquid medium.

In some embodiments, the communication module further includes a transmitter configured to transmit a data signal through the liquid medium, and the controller is also configured to provide output to the transmitter. In certain embodiments, the method further includes at least a second vehicle in communication with the tag device, and the first vehicle and the second vehicle are selected from the group comprising an autonomous underwater vehicle, a remotely operated vehicle, a vessel, a glider, a submarine, a mini submarine, and a human-occupied vehicle. In some embodiments, the system is adapted to operate at depth greater than 100 meters. In some embodiments, the attachment mechanism includes a multi-tiered release capability including at least one of a command-initiated release, a depth-dependent release, and a timed-based release, a power level-based release. In one embodiment, the system is capable of autonomous tracking and close distance recording of the target.

This invention further features a method of autonomous tracking of a movable target on or in a liquid medium, including selecting at least a first tracking vehicle configured to travel on or in the liquid medium and configured to send at least one command signal, and selecting at least one submersible tag device including (i) a liquid-tight housing defining a chamber that remains isolated from the liquid medium when the housing is immersed in the liquid medium, (ii) an attachment mechanism configured to attach to a target selected by a user, and (iii) a communication module disposed in the chamber, the module including a receiver, a controller configured to receive input from the receiver, a power source operatively connected to at least the controller, and data storage. The method further includes securing the tag device to the target utilizing the attachment mechanism to achieve a tagged target, and receiving at least one command signal through the liquid medium from the tracking vehicle to the tag device to alter a condition of the tag device.

In some embodiments, the tag device is selected to not perceptibly alter movement of the target. In one embodiment, the method further includes utilizing the tracking vehicle to maintain at least real-time locational information of the tagged target. In certain embodiments, the method further includes employing one or more approach strategies to monitor the tagged target. In one embodiment, the method further includes positioning the tracking vehicle at a depth that is not the same as depth of the tagged target. In a number of embodiments, the communication module further includes a transmitter, the controller is also configured to provide output to the transmitter, and further including transmitting data signals from the tag device through the liquid medium to at least one of the tracking vehicle, a surface vessel, an aerial drone, and a satellite.

BRIEF DESCRIPTION OF THE DRAWINGS

The drawings described herein constitute part of this specification and includes an exemplary embodiment of the present invention, which may be embodied in various forms. It is to be understood that in some instances, various aspects of the invention may be shown exaggerated or enlarged to facilitate an understanding of the invention. Therefore, drawings may not be to scale.

DETAILED DESCRIPTION OF THE PREFERRED EMBODIMENTS

Figure 1:
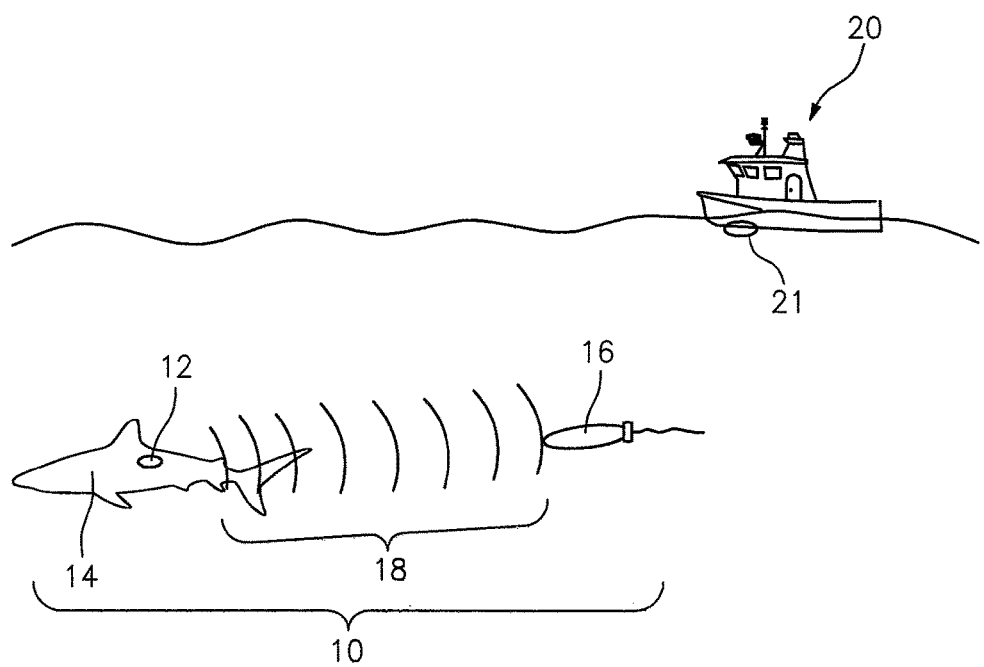
FIG. 1 is a schematic side view illustrating the inventive system, including a target, a tag device, a tracker and a remote monitoring vessel.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

This invention may be accomplished by a submersible tag device configured to operate within a liquid medium such as fresh- or salt-water, including a liquid-tight housing defining a chamber that remains isolated from the liquid medium when the housing is immersed in the liquid medium, and an attachment mechanism configured to attach to a target selected by a user. The tag device further includes a communication module disposed in the chamber, the module including a receiver, a controller configured to receive input from the receiver, a power source operatively connected to at least the controller, and data storage. When the tag device is immersed in the liquid medium, the receiver is configured to receive a command signal through the liquid medium.

In a preferred construction, tag devices according to the present invention enable tracking of marine target (sharks, whales, ships, submarines, etc.) through the marine environment, and receive and transmit information to a tracking vehicle. Preferably, the tag device receives information from the tracker, allowing the tag to change its operation or to perform an action. In the simplest sense, the information sent may be used to modulate the tag's transmitting frequency or status (e.g. start/stop), thus avoiding detection or saving battery life. In more complex embodiments, the tag contains an actuator mechanism, enabling sent information to actuate a target (e.g. a bomb, light, drill, etc.).

Definitions

Argos satellite network. Also referred to as Argos satellites, Argos, Argos satellite communication, satellite network, satellite relay. The Argos network is a system space-based satellites that receivers and transceivers located 850 km above the planet. Using the Doppler effect, the system can accurately geographically locate the received information. The system comprises of the satellites, terrestrial receiving stations and two major processing facilities. The network can deliver data from extremely remote locations to an end user in real time or near real time.

Argos Location Class. The Argos Location Class, or simply location class(es), refers to the classified amount of locational error that results from different equipment used in the Argos system. Classes are grouped based on type of location (Argos or GPS), estimated error, and number of messages received during a satellite pass. Combining these criteria, an estimated error is calculated by the system and ranges from less than 100 m, to greater than 1500 m.

Fluid body. A fluid body refers to any structure, feature, or geographical formation capable of holding or retaining a fluid and the fluid contained therein. Examples of fluid bodies include but are not limited to, an ocean, bay, lake, river, reservoir, tank or pipe. The fluid can be any liquid, including water, saltwater, oil, liquefied gas, ethanol, wastewater, or the like. In this disclosure, the 3 dimensional area of a fluid body may be referred to as a "medium," a "liquid medium" or "multi-dimensional space". The fluid bodies of the invention are generally of a size and structure capable of simultaneously accommodating, in addition to the fluid, a target to be tracked and a device or vessel intended to track the target.

Submerged vehicle. A submerged vehicle refers to any motile vehicle, vessel or device capable of being introduced into and operating within or on the fluid, or fluid body. Many submerged vehicles are commonly referred to as underwater vehicles, although they may operate in other fluids besides water. In this disclosure, a submerged vehicles includes, but is not limited to AUVs, drones, remotely operated vehicles (ROVs), unmanned underwater vehicles (UUVs), submarines manned or unmanned, amphibious vessels and the like.

Remote monitoring facility. The remote monitoring facility is capable of receiving or transmitting information to the tag or tracker. The signal used to carry information between the monitoring vessel and the tag or target may or may not be continuous, and may be broken or interrupted for long stretches of time. The monitoring vessel is often where a remote user analyzes the data and information received from the inventive system. However, the monitoring vessel may be unmanned and automated, and purely serves to transmit the data to another source. In these cases, the monitoring system may include, but is not limited to, an unmanned aerial vehicle (UAV), AUV, ROV, UUV, a drone, or satellite. The remote monitoring facility may also be referred to as the monitoring station, monitoring facility remote monitoring vessel, monitoring vessel, other monitoring vessels, or simply other vessels or other facilities. Typical monitoring facilities include but are not limited to ships, boats, barges, buoys, docks, aircraft or watercraft and land based facilities and stations.

Tag. As used herein, the term "tag" refers to the object which may be attached to the target to be tracked. The tag provides a signal to facilitating tracking of a moving target through the desired medium. In most embodiments. The tag both receives and sends information to the tracker. In some embodiments, the tag gathers additional information. The tags of the invention 1.) are submersible. A submersible tag is intended to be used and to operate within (submerged in) the fluid in which the target will be tracked. 2.) stay affixed to the target for the desired period of time after they are attached to the target. 3.) do not unfavorably alter the "behavior" of the target to which they are attached when operating within the fluid. 3.) are capable of transmitting a signal to be tracked within the medium. 4.) Have a receiver capability to receive and process signals. In preferred embodiments, the innovative tag is releasably attached to the target. In this disclosure, the terms "miniature tag," "mini tag," "mini-tag," and simply "tag" refer to the same object.

Tag imaging system. The tag imaging system refers to the electromagnetic recording device present in some embodiments, as part of the tag. The tag imaging system allows the tag to capture the point of view of the target. The tag imaging system comprises at least an electromagnetic radiation sensing device, capable of collecting and recording at least a portion of the electromagnetic spectrum.

Target. As used herein, the term "target", refers to as target animal, target vessel, attached animal, attached vessel, tagged animal, tagged vessel and the like, describes the object of interest to which the inventive mini-tag is attached. In general, the target is an object or being the location of which is important to know at some point in time. The target may be any wholly or partially submerged object, living or inanimate, that may be tagged. The use of the term target or target animal in a particular embodiment described herein is not meant to be limiting and in most circumstances refer to any target.

Target Behavior. The motility and navigation capabilities of the Target constitute detectable aspects of target behavior. Other detectable aspects of target behavior could include buoyancy, drag, acceleration & deceleration. Under ordinary operating conditions the inventive tag does not detrimentally affect specific Target Behaviors. Generally the attachment of the tag to the target does not affect the target's behavior in an unacceptable way. For example, if studying animal behavior by tagging and tracking, the tag must not prevent the animal from its normal movements. In most embodiments the target is motile. Motility may be driven by active swimming, floating and drifting, paddling, or mechanical or electromagnetic propulsion system.

Tracking vehicle. In this disclosure, the terms "tracking vehicle," "tracking vessel," "tracker," and the like refer to at least one submergible (wholly or in part) vehicle that is communicatively linked to the tag. The tracking vehicle provides the capability to at least communicate with, monitor, and localized the tag. The link between tracker and tag need not be continuous, but may be intermediate. The tracker is any vehicle, or vessel capable of moving through the fluid to follow the tag. The tracker may be further communicatively linked with additional trackers or remote monitoring vessels.

Vehicle. As referred in this disclosure, a "vehicle" is any controllable object that can physically move through the desired medium or fluid. The vehicle can be any appropriate object, as commonly known in the art, including but not limited to a ship, boat, barge, or other human-occupied vehicle, AUV, ROV, UUV, submarine, or other submerged craft.

System Overview

The inventive miniature tag-tracking system offers expanded and novel capabilities over existing tagging technologies. The new capabilities include 1) a universal, receiving and transmitting tag, 2) a customizable actuating mechanism, 3) 3 dimensional, high resolution tracking and monitoring, and 4) fully autonomous, up-close 24 hour-a-day electromagnetic radiation imaging (e.g. videography, photography). Features enabling these capabilities include: innovative two way communications to a following tracker, an actuator mechanism capable of acting on the target, and 3 dimensional target tracking.

This invention allows for tracking a wide variety of objects on or immersed in fluid bodies, including aquatic animals, vehicles and other moving objects capable of being tagged. The preferred systems and methods comprise at least the improved miniature tag, and in additional embodiments, further comprises a tracker 10, such as a surface vessel, a manned or unmanned airplane, an underwater vehicle such as an AUV, a remotely operated vehicle (ROY), or an unmanned underwater vehicle (UUV).

Preferred embodiments of the tag-tracking system 10 are illustrated in FIG. 1, and include a tag 12 capable of securing to one or more species or types of targets 14, and communicating via signals 18 by receiving and transiting information to the tracker 16 and an optional remote monitoring facility or vessel 20. The present invention is innovative over existing tag tracking systems that rely on moored buoy networks, or require the target to surface for satellite communication. Furthermore, the inventive system allows for use of a communication frequency (i.e., effective communication frequency) out of hearing range for the target animal or sensor detection of the target vessel, employing a safe release from the target, and withstanding deeper depths of the fluid body without damage to the tag itself. Such a tag can be utilized to create an activated locational network to track targets across the globe, not just by knowing where they are, but by being able to pinpoint individuals over multiple seasonal migrations and even capture close distance imaging or other sensor parameters using the tracking vehicle 16. The disclosed tag offers much needed validation in our understanding of hypothesized foraging and mating migration patterns in multiple species throughout the pelagic environment.

Mini Tag Overview

The inventive tag is designed to vastly improve target tracking, allowing an as-of-yet level of understanding of covert vessel tracking, never before seen ecosystems of predator-prey interactions, and individual animal migration behaviors. The tag enables the inventive system to work with almost any target, is capable of on-demand actions, it is expendable or recoverable as needed, and has a unique actuating mechanism. The tag attachment is universal, multi-target compatible using secure mounts including suction cup technology as well as intramuscular dart methods. In preferred embodiments, the miniature tag is designed as an expendable component. Other embodiments of the miniature tag has a buoyancy adjustment mechanism for release and recovery. Furthermore, virtually all mini tag embodiments are compliant as to work with different tracker vessel embodiments. Different embodiments of the present invention are further specialized to work in different fluid bodies, enabling tracking virtually any multi-dimensional tracking.

Tag Components

Figure 2:
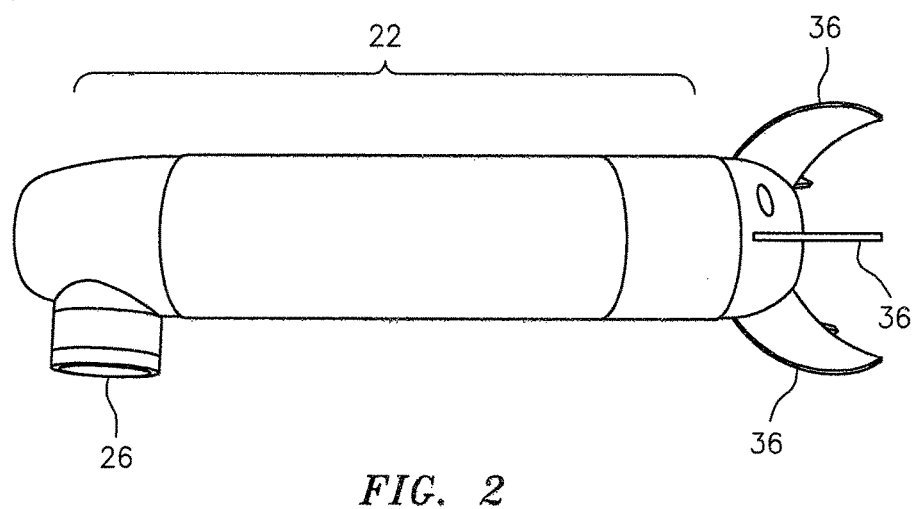
FIG. 2 is a schematic side view depicting the exterior tag design, according to one embodiment.
Figure 3:
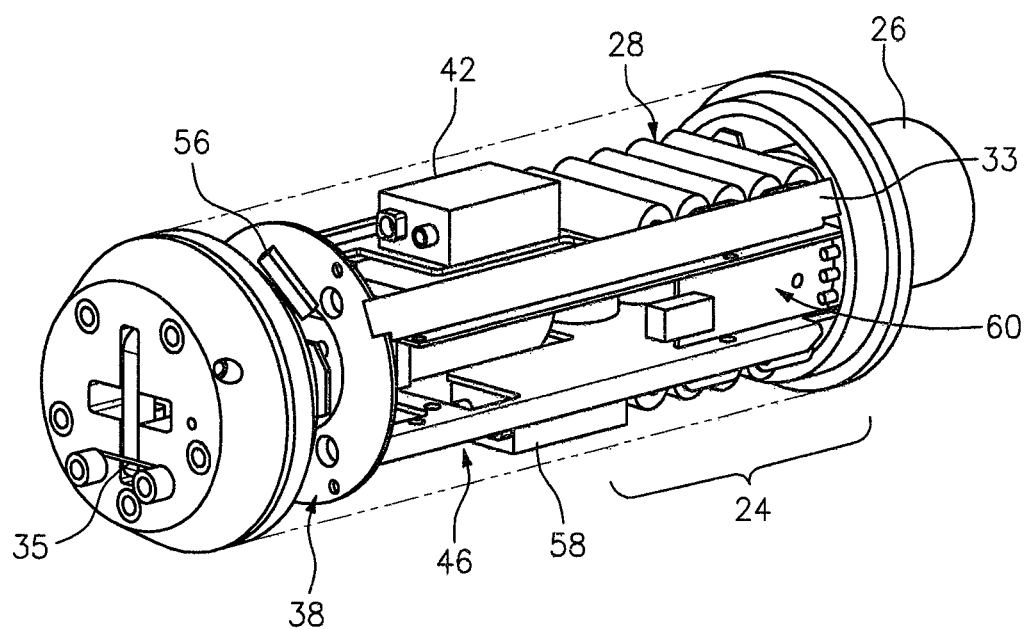
FIG. 3 is a schematic perspective view of the inner components of one tag's embodiment.
Figure 4:
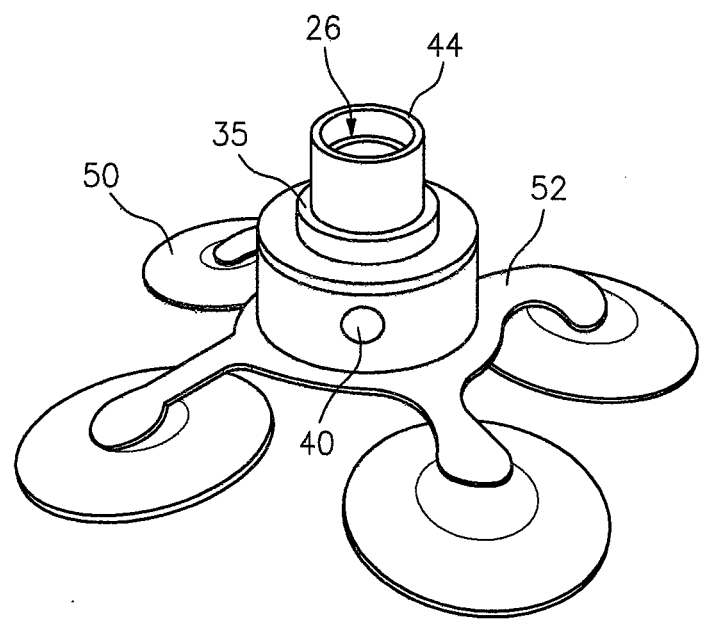
FIG. 4 is a schematic perspective view illustrating another embodiment of the inventive tag design, with an external mount suction cup attachments and a releasable communications system.

The improved tag 12 is shown in more detail in FIGS. 2 and 3, and generally comprises a housing 22, an electronics module 24, a communication system 26, a power source 28, an attachment mechanism 30, and an optional actuator mechanism 32. Optionally, some embodiments further contain a buoyancy compensation mechanism 33 such that the tag is buoyant, and once the tag 12 is released from its target 14, it will float to the surface for recovery. In some preferred embodiments, the tag further comprises an optional depth sensor 38 that measures and telemeters depth. In some embodiments, the tag further comprises a separate tag imaging system 40, as illustrated in FIG. 4, which provides a view of the target's behavior.

In one embodiment, the tag 12 is approximately 5 inches long by 2 inches in diameter comprising a communication system 26 (e.g., a receiver and pinger) with pulse delay depth-telemetry capability allowing for 3-dimensional AUV tracking and following of a randomly moving animal or target.

Housing

The tag 12 comprises a water proof or water resistant housing 22 which has a cavity disposed within it for storing electrical components such as the electronics module 24 and in some instances, the communication system 26, the actuator mechanism 32, and the releasing mechanism 35. The overall size of the housing is scaled down to a minimum size intended to be less disruptive to the target to further add to the longer attachment duration for unassisted tracking.

It is preferred that the housing is provides robust protection against environmental conditions including water or other fluid, salt, temperature, physical impact, rough behavior by the target, particles, and debris. Additionally, the housing is designed to be fluid-proof (e.g., sealed and pressure-proof) capable of withstanding the pressure forces of the surrounding environment at the desired depth of use. For many applications, the housing is designed to track the target of interest at depths greater than 50 m, 70 m, 80 m, 100 m, 150 m, 200 m, 300 m, 400 m, and up to 600 m. In some embodiments, the tag is further modified for a depth rating up to 1,000 m, up to 1,500 m, up to 2,000 m, up to 6,000 m, and in even some cases, up to 11,000 m.

The housing is comprised of a lightweight material with a strength capacity matched to the intended depth of use. In many embodiments, the housing is comprised of aluminum or aluminum alloy or a material of similar strength qualities. Other materials include titanium, steel, steel alloy, thermoplastics, or the like as known in the field and suited for withstanding the pressures of use at desired fluid depth.

In some instances the components within the cavity will be embedded in a solid plastic or other resin to protect the components from pressure and/or fluid. In some embodiments, the housing is hydrodynamic, as illustrated in FIG. 2, to reduce drag caused by the tag, and therefore lessen its impact on the target. In some hydrodynamic embodiments, the tag housing further comprises a stability mechanism 36, such as at one fin, vane, or maneuvering appendage. In some embodiments, the housing is spherical (as shown in FIG. 3) which avoids orientation issues in communication when attached to a target. Such housing may be comprised or ceramic or any other suitable material as described above.

Communication System

The Tag comprises the capability to both receive and transmit signals. In many embodiments a single communications system 26 comprises both functionalities. In other embodiments, transmitter and receiver capabilities are provided by separate components, such as when the transmitting capability is based on the emission of light from an LED, and the receiver detects acoustic signals, allowing for real-time communication of position parameters and locational information via a transponder to the tracker vehicle. In some embodiments, the tag receives and transmits acoustic signals to the vehicle following the tag (e.g., tagged target). In some embodiments the communications system receives and transmits to additional vehicles, vessels, or monitoring facilities.

A command from the tracker (or other source) may be sent to the communication system to activate an actuator mechanism. In other embodiments, the communication system 26 is releasably attached to the tag as illustrated in FIG. 4. In these embodiments, the communications system is released from the tag by the releasing mechanism 35 and may further comprises an optional surface locating system 42, described elsewhere herein. The released communication system then floats to the surface and is recovered. In some embodiments, the remote monitoring vessel 20 used in the target tracking operation may be used to command and locate the released communication system. In other embodiments, the standard acoustic systems on the tracker 16 are used to command and locate the released communications system The communication system, in some embodiments, further comprises a communications system casing 44 which is constructed to withstand fluid depths at least as deep as the depth rating of the tag housing 22, or greater. In specific embodiments, the communications system casing 44 is constructed in a spherical design to allow the communication system to operate (e.g., receive, transmit) in an omnidirectional manner, avoiding orientation issues due to beam pattern. The ceramics and internal electronic components are preferably kept small in size to fit in to a pressure housing with the transducer potted with polyurethane or other suitable compound on the end or adapted for an oil-filled casing.

The tag geometry is significantly modified to be more streamlined with approximately the same overall displacement or less as existing tags. In many embodiments, the communication system is directly attached or mechanically coupled to the mount holding the system with its target. In other embodiments, the communication system is an individual component tethered, towed, or otherwise indirectly attached to the mount. In this tethered configuration, the communication system is constructed with positive buoyancy, to prevent drag on the target and allow recovery. A limiting factor for the communication system' size is incorporating enough buoyancy and displacement system 33 to compensate for the weight of the internal components.

In some embodiments, the communication system is adapted to transmit (e.g. ping) to the tracker such that the tracker can determine dynamic speed and perform terrain following. Terrain following includes one vehicle (e.g. the tracker) to follow another vehicle (e.g. the target) through complex environments, such as canals, trenches, valleys, slopes and the like. In further embodiments, the communications system is adapted for multiple vehicle tracking, and is capable of communicating with multiple tracker vehicles simultaneously.

In some embodiments, the communications system consists of a 25 kHz transponder. In further embodiments, the communications system consist of a hydrophone transducer, for example the High Power Broadband Transducer available from Benthowave Instruments.

Operation Frequency

The typical communication frequency of the existing tags prevents cross-species applicability. For example, tags used for animals such as sharks are designed to operate by acoustic communication in the range of about 25 kHz. Such a tag is suitable for a shark, may be unsuitable for another type of animal such as a whale which has hearing within that frequency range. Therefore, the present invention is designed to be substantially less acoustically disruptive, adding to the long-term unassisted tracking capabilities of the system, by redesigning the system to operate at an effective communication frequency. The effective communication frequency limits the range in which the tag communication is performed and operates at a less disruptive frequency among more than one animals while still providing effective and reliable communication between the tag and the tracking vehicle and/or the nearby operating vessel.

The miniaturization of the tag, at least in part, allows the utilization of the effective communication frequency and opens up opportunities of tracking a plurality of animals from sperm whales to Bluefin tuna. This is accomplished by modifying the electronics package in the communication system with frequency components compatible with the hearing ranges of the desired targets for tracking. In some embodiments, a higher frequency system comprising an effective communication frequency above or below 25 kHz is utilized, such as between 10 kHz to 100 kHz. This effective communication frequency is approximately 26 kHz to 200 kHz, 50 kHz to 150 kHz, 50 kHz to 100 kHz, 60 kHz to 80 kHz, or 70 kHz. In a specific embodiment, a communication system comprising 70 kHz is employed for a tag designed for sharks, whales, squid, and fish (e.g., tuna). In other embodiments, the tag receives a 25 kHz interrogate signal from a standard submerged vehicle, and its reply to the communication system/tag is at 70 kHz in order to be compliant with a full range of ocean animals. In some embodiments, a frequency of 10 kHz is utilized. In further embodiments at least one or both transmission and receiving frequencies are changed in real-time in the tag and tracker simultaneously. As known in the art, the tag's communication frequency may be further modified in a similar manner to use with other types of targets to maintain substantially reduced acoustic disruption to the target.

Actuator Mechanism

The present invention comprises an actuator mechanism 32, that acts on one or more actuator targets 34. The optional actuator and actuator target provides a hitherto unseen ability of a tag to perform additional tasks. The actuator mechanism can be coupled to almost any type of actuator target. The actuator is communicatively linked to at least the tag electronics package 24, the communications system 26, the tracker 16, and the remote monitoring facility 20. The actuator mechanism is most often located in the housing 22, or in some embodiments, may be attached to the exterior of the housing. The actuator mechanism is electronically connected to at least one of the tag power source 28 or optional release mechanism power source 56.

The actuator mechanism 32 may comprise of any actuator or mover system as commonly known in the art, including but not limited to an electric motor, a hydraulic actuator, a pneumatic actuator, a magnetic actuator, a thermal actuator, and a mechanical actuator (e.g. switch or rack and pinion). In some preferred embodiments the actuator mechanism comprises an electric motor that produces mechanical torque to act on the actuator target. In some preferred embodiment, the actuator mechanism comprises the releasing mechanism, and uses mechanical torque to release the tag or communications system from the target. The actuator as a releasing mechanism will be described below herein. In other embodiments, the actuator and releasing mechanism are separate and the actuator mechanism performs different work.

Actuator Target

The actuator target 34 may be any mechanism or system that can be acted on by an actuator. In some embodiments, the actuator target may be a valve, that when acted upon allows the surrounding fluid in to interior of the attachment mechanism, thereby releasing the tag. In further embodiments, the actuator target may be an arming switch for an explosive, such as disclosed in U.S. Pat. No. 3,931,488. In another embodiment, the actuator target may be a mechanical or electrical drill or wire cutter (such as disclosed in U.S. Pat. No. 9,550,553). In yet another embodiments, the actuator target is a light, or beacon. In some instances, the actuator target may stay affixed to the tag once acted on by the actuator, and in other instances, be released from the tag as it is acted on by the actuator.

Power Source

The tag may be powered by any suitable power source, such as a lithium-ion battery or other battery types as long as they are capable of providing the necessary output for the length of mission duration. The present invention has a power source connected to provide power to at least the communication system 26 and electronics package 24. In some embodiments, the power source is further electrically connected to the releasing mechanism 35, the actuator mechanism 32, the depth sensor 38 and any optional additional sensors 46 present in a given embodiment. In a specific embodiment, the power source is a 3.7 V lithium battery for battery life of at least 1-2 months. In some embodiments, the tag is programmed to wake at least one of the electronics package, actuator and communications system infrequently, and to extend the battery life for at least a year. In some embodiments non-battery power sources are used to power the tag and its components. These non-battery power sources include wave and fluid current energy, bio-electricity, thermal heat transfer, vibrational, and solar energy sources.

Attachment Mechanism

Another aspect of the present invention that further improves the tag and system for use with multiple targets (e.g. animal species or vessel types) is the tag mount which is adapted to the target(s) of interest. The present invention comprises an attachment mechanism such that the tag can attach to a target without needing any pre-existing, specialized equipment present on the target (e.g. a winch, boom, cable, or hook on the target). Due to their large size, existing tags such as those used for sharks are inserted into muscle tissue using common harpoon dart methods. But that technique has low retention rates, as the large tag creates significant drag in the fluid body. Existing tags are also attached to the cartilage tissue of the dorsal fin; however, there tags are generally much smaller than those inserted into the musculature to prevent tearing the cartilage and therefore lack many of the technological capacities of larger tags or the present invention. Furthermore, dorsal fins tags require the target animal to be removed from the fluid for tagging, whereas muscle tagging allows the shark to remain in the fluid, allowing for less disruption and stress to the target. It is an aspect of the present invention to provide a small, technologically advanced tag that can be securely mounted on a target via the least impactful route which varies between targets of interest.

Figure 5A:
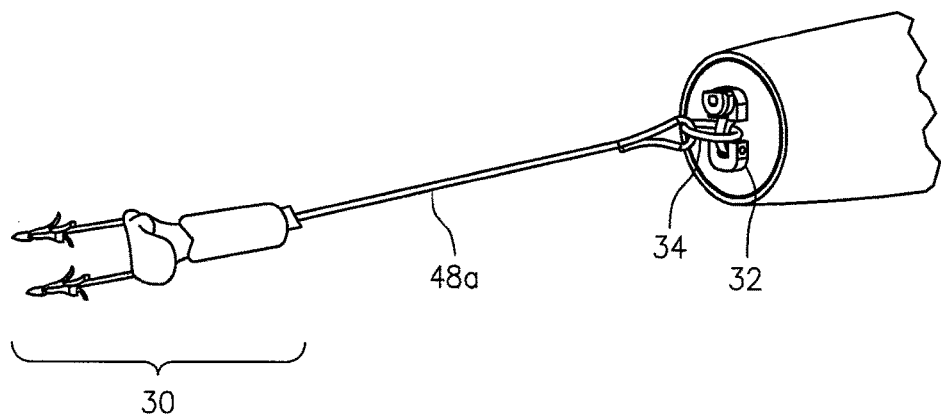
FIG. 5A is a schematic partial perspective view illustrating one tag design with an intramuscular mount, a releasable link, and a releasing mechanism.
Figure 5B:
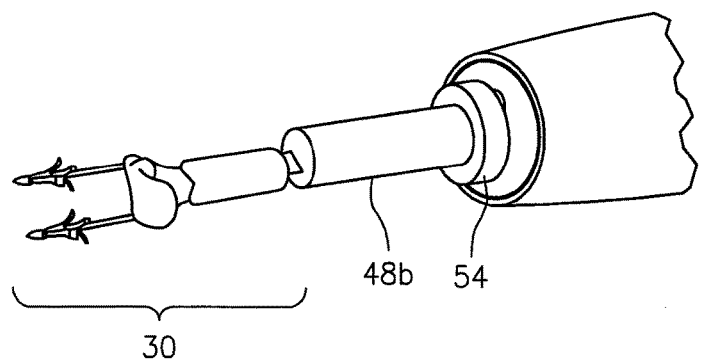
FIG. 5B is a schematic partial perspective view illustrating another tag design with an intramuscular mount, a corrodible releasable link, and a fluid reservoir for the corrosive fluid.

Turning to FIGS. 5A and 5B, in one embodiment, the tag attachment mechanism 30 comprises an intramuscular mount. The intramuscular mount comprises any suitable pointed end for penetrating the target, and a protrusion designed to prevent the mount from exiting the target. In the preferred embodiments, the intramuscular mount further comprises a basic releasable link 48a, FIG. 5A, and releasable link 48b, FIG. 5B, with a corrodible releasable link and a fluid reservoir 54 for the corrosive fluid. The releasable link may be any suitable link as commonly known in the art, including, but not limited to a corrodible metal wire, a burn wire, a fastener, screw, tie or any other fastener that releasably attaches. The releasable link may further comprise a cable or other extension that separates the releasable link from the tag. The length of the overall attachment mechanism may not be such that it introduces undue drag, shear forces, or changes in buoyancy of the target. In preferred embodiments, the attachment mechanism length does not exceed 1, 2, 3, and 4 lengths of the tag housing. In other embodiments, the attachment mechanism length is 0.1 mm, 1 mm, 100 mm, 1 foot, and 10 feet in length. The miniaturization of the tag for use with an intramuscular mount substantially increases the tag attachment time to the target over existing tags utilizing the same mode of attachment.

Turning to FIG. 2, in another embodiment, the tag is attached to a target (e.g., turtle, whale, etc.) by means of an external mount attachment mechanism 30. The external mount attaches securely to the outer surface of the target such as the shell, skin, vehicle housing, metal surface, plastic surface, and other like materials that are typically substantially smooth. Shown in FIGS. 6-8, the external mount attachment mechanism embodiment comprises one or more attachments 50 and a mounting mechanism 52 to secure the tag to the target surface. The tag 12 is connected to a mounting mechanism 52, and the mounting mechanism is connected with at least one attachments 50 such as suction cups. The attachment may include any means to secure the tag to a target's outer surface, including but not limited to an adhesive, glue, magnetic, additional fasteners (e.g., screws, bolts), a vacuum force pulled upon the interface between the attachment and the outer surface of the target, and among other methods as known in the art. In further embodiments, the attachment 50 may be connected to the mounting mechanism 52 by a releasable link 48, similar to the intramuscular mount embodiment, but with an external mount attachment. In similar embodiments, the mounting plate is attached directly to the outer surface of the target by one or more of the methods described above.

Figure 6:
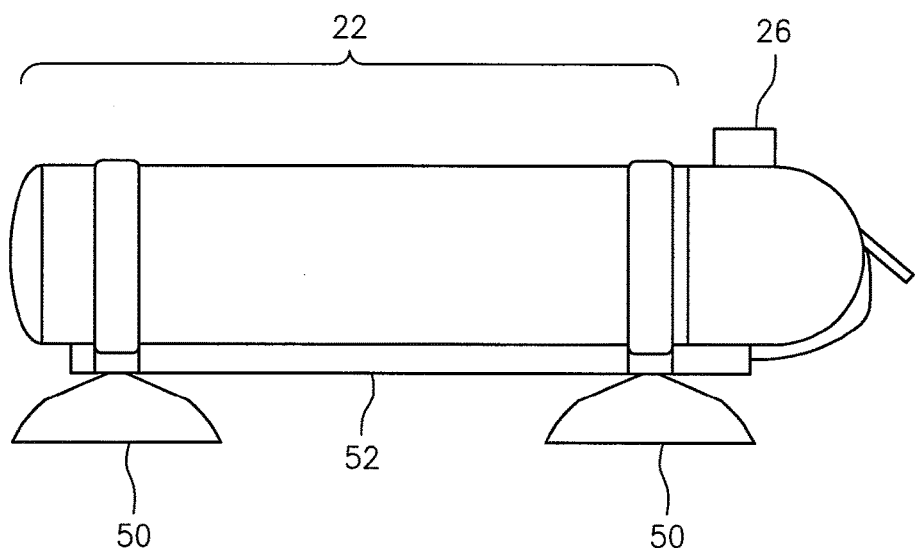
FIG. 6 is a schematic side view depicting one embodiment of a tag design secured with a bracket mount.
Figure 7:
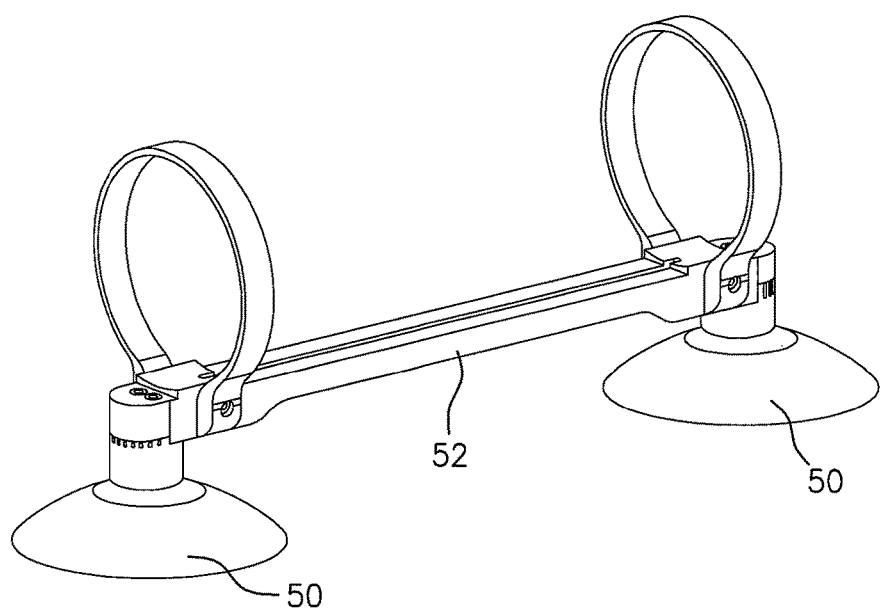
FIG. 7 is a schematic perspective view illustrating the bracket mount of FIG. 6.
Figure 8:
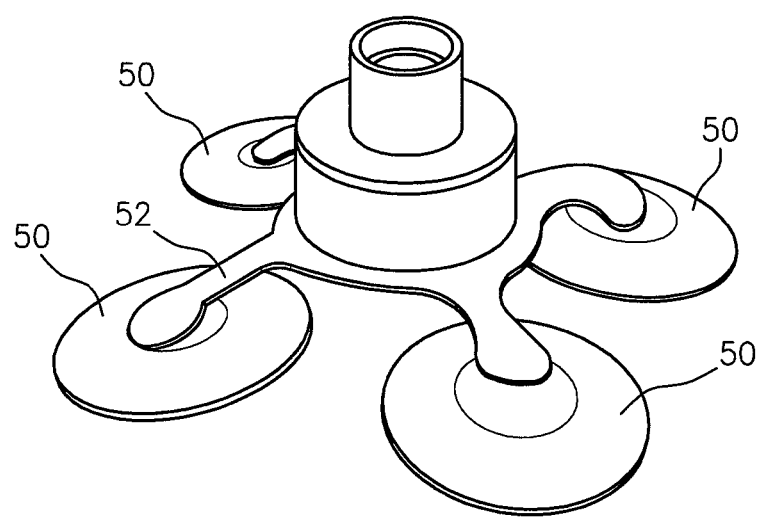
FIG. 8 is a schematic perspective view illustrating yet another tag embodiment, specifically one with four suction cup attachments.

As illustrated in FIGS. 6-7, the tag may be secured with a variation of the external mount, referred to as a bracket mount. The bracket mount comprises as frame which is engaged with the attachments. Shown in FIGS. 6 and 7, the attachments 50 are hemispherical cups (e.g., suction cups) which directly engage with the outer surface of the target 14. In other embodiments, the attachments may comprise any of the means described above. The attachments are attached to the mounting mechanism, which in these instances further forms a frame around the tag.

Release

The releasing mechanism serves to dependably release the tag (or at least the communication system) from the target upon command or time release. According to one embodiment, the system is equipped with a motor-driven releasing mechanism. An acoustic command may be sent to the communication system from the tracker 16 or other source to initiate release from the target 14. The release command can also be sent from the tag at the end of each operation, or at the triggering of another critical parameter. This is a significant improvement over previous tags, which solely employed a burn wire-based discharge method, particularly as burn wires provide a one-off attempt to initiate release. Furthermore, burn wires tend to have a slow response to complete the release. While the present invention may be adapted to use a burn wire-based releasing mechanism, motor-driven release is easier to reset to a re-deployable state out in the field, does not create as much internal heat on the electronics, and can be used in non-salt water fluid bodies, unlike a burn wire release method (e.g. fresh water or oil containing fluid). Motor-driven release is quicker and improves odds that the tag will be recovered.

Turning to FIG. 5B, the releasing mechanism in some embodiments comprises a corrodible releasable link 48b connecting the attachment mechanism to the tag, or the communications system. Upon a release command, the releasing mechanism acts such as by flooding the corrodible link 48b with a corrosive fluid, either the surrounding fluid or from an optional corrosive fluid reservoir 54, fluidly connected to the corrodible link.

Embodiments described herein that contain recoverable tags or recoverable communications system may further comprise a surface locating system 42. The surface locating system enables a user in a remote monitoring vessel 20 to receive the tag's positional information over long distances. The surface locating system 42 may comprise any standard, non-submerged, transmission method as known in the art, such as a GPS transceiver, a very high frequency (VHF) transponder, and a satellite transceiver. Various release and retrieval devices are described in U.S. patent application Ser. No. 15/601,441 by Partan et al. entitled "Retrieval System for Underwater Objects" and commonly owned with the present application.

Depth Safety Release

Figure 9:
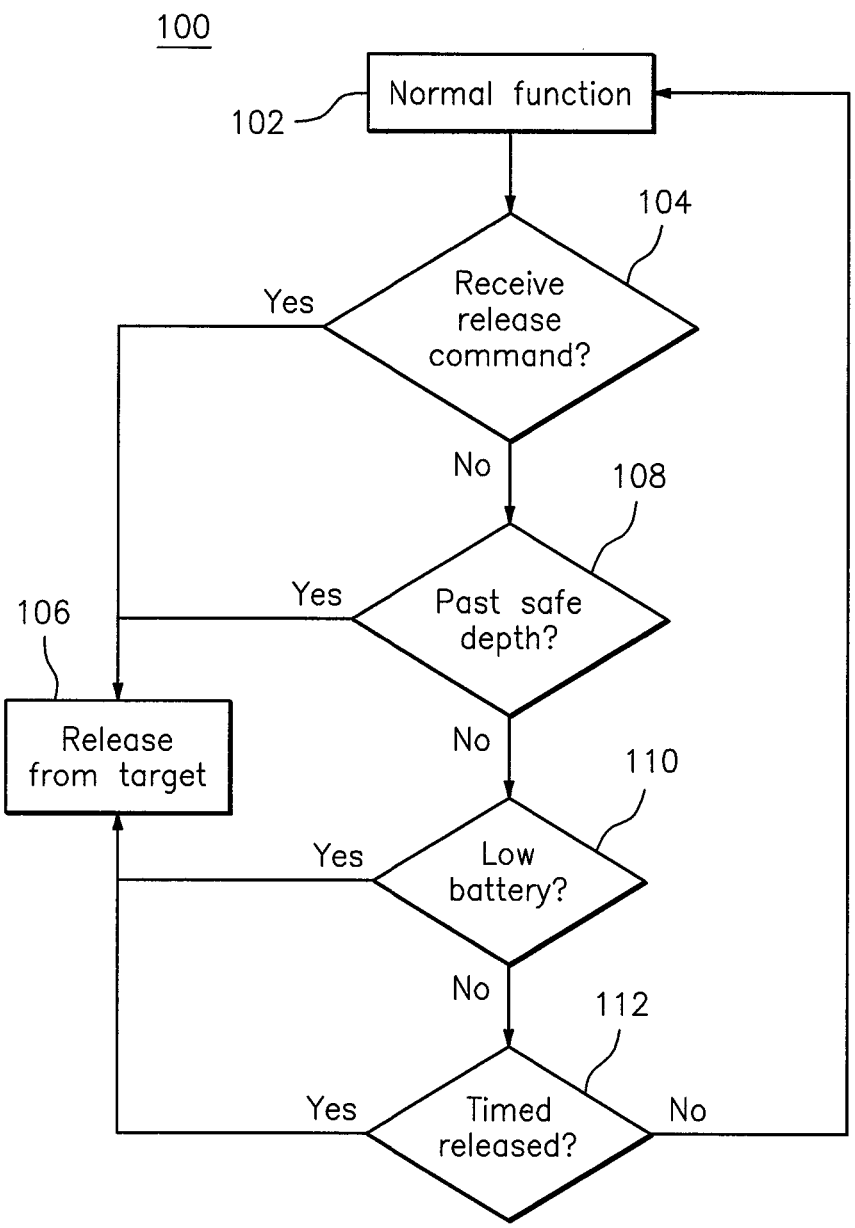
FIG. 9 is a schematic flow chart of possible release situations, according to the present invention.

In order to increase reliability and recovery while reducing impact on the target, certain constructions of the present invention employ a multi-tiered releasing mechanism as illustrated by flowchart 100, FIG. 9. Beginning with normal operation, also referred to as normal function 102, the system determines whether a release command has been received, step 104. If yes, then some or all of the tag device is released from the target, step 106. If no release command has been received, then the depth is determined and compared to a pre-selected "safe" depth, step 108, that is within engineering tolerances for the tag device. If beyond the safe depth, then release is activated, step 106; if not, then the operation proceeds to check "low battery" status, step 110, and then timed release, step 112. These techniques are described in more detail below.

In one construction, the releasing mechanism includes at least one additional safety release method to discharge the tag 12 from the target 14 in cases of failure of the main release effort, loss of communication with the tracker 16 and/or monitoring vessel 20, and unexpected decent into fluid depths greater than the depth rating of the tag. For instance, a tagged shark or unidentified submarine may make a quick deep dive without enough time to communicate a signal to the communication system 26 to engage the releasing mechanism 35; pressure housings of animal tags have been known to explode due to the increased pressures at depth, causing substantial harm or even death to the tagged animal. Tag implosion could also significantly damage a tagged vessel, resulting in negatively impacting target behavior, target loss or alerting the target to its tracked status. Some constructions of the present invention circumvent these issues by incorporating a backup safety release method into the releasing mechanism which, upon reaching a specified depth, automatically disengages from the target for recovery. The depth release of step 108, FIG. 9, would be programmed to release at or above a depth at the depth rating of the tag, preferably within 70%, 85%, 90%, 95%, 99%, 105%, 110%, 120%, and 130% of the tag's depth rating. In one embodiment, the safety release method involves the electronics package 24 interpreting information from the depth sensor 38, and sending the release command to the releasing mechanism 35. In tag embodiments that do not have depth sensors, the tracker 16 determines and communicates depth to the tag in real time and the tag electronics package 24 processes said information and communicates to the releasing mechanism 35 if a depth safety release is required.

Low Battery Safety Release

Staying with FIG. 9, step 110, an additional release tier is the state of the power source 28. In the case of low battery, the electronics package 24 will receive information pertaining to the power source level and initiate a controlled safety release through the releasing mechanism 35 before the power source losses power. In some embodiments, the safety release further comprises a safety release battery 56, interconnected with the main power source 28 and the releasing mechanism 35. The safety release battery 56 is kept at full charge by the power source 28 at all times. In the event of a power failure, the safety release battery has sufficient charge to power the releasing mechanism 35, so that the tag 12 or communications system 26, depending on embodiment, is successfully released from the target and not lost.

Time Safety Release

Another release tier is a pre-determined time period. As commonly known in the art, the electronics package measures time. The user may programmatically set electronics package to trigger the releasing mechanism resulting in tag release, as diagramed in step 112, FIG. 9.

Buoyancy Control

An important element of the present invention is the tag's buoyancy. In many situation, the user may want to recover the tag after it has served its purpose on the target. As described above, many embodiments of the inventive tag comprises a releasing mechanism that releases the tag from the target in the absence of the user. The tag further comprises a buoyancy compensation mechanism that enables the desired final outcome of the tag. In some embodiments, the buoyancy compensation mechanism is positively buoyant, allowing the tag to float to the fluid-body surface for optimal retrieval. In other embodiments, the buoyancy compensation mechanism 33 is negatively buoyant, allowing purposeful, clandestine disposal of the tag.

Positive Buoyancy

As illustrated in FIG. 3, some preferred embodiments of the tag comprise a positively buoyant buoyancy compensation mechanism, constructed of any positively buoyant material as commonly known in the art, including but not limited to foam, syntactic foam, rubber, synthetic rubber polymers, and any material with a specific gravity less than the surrounding fluid. The buoyancy in these embodiments may be 0.1, 0.5, 1, 2, 5, 10 and more pounds positively buoyant. In one particular embodiment, the buoyancy compensation mechanism 33 comprises of sheets f HCP-70 Hydraulic Crush Point closed cell foam, available from Divinycell.

Purposeful Disposal

In some embodiments, the user may wish to release the tag from the target and not have the tag recovered or discovered. In these situations, the present invention will comprise a buoyancy compensation mechanism 33 that is negatively buoyant, including, but not limited to steel, titanium-metal alloy, other rust-resistant metals, lead, concrete and any material which has a specific gravity more than that of the surrounding fluid. The buoyancy in these embodiments may be −0.1, −0.5, −1, −2, −5, −10 and more pounds negatively buoyant.

As illustrated in FIG. 3, some embodiments of the present invention further comprise an optional self-destruct mechanism 58, in informational communication with at least the electronics package and the communications system. The self-destruct mechanism may comprise any self-destroying method for fluid-body submerged objects commonly known in the art. In one preferred embodiment, the self-destruct mechanism 58 comprises an explosive charge inside the housing. In another embodiment, the self-destruct mechanism comprises computer language code designed to wipe any information and data stored in the electronics package.

Depth Sensor

As illustrated in FIG. 3, some embodiments of the present invention further comprise a depth sensor 38. The depth sensor is communicatively connected to at least the electronics package and communications system and electrically connected to the power source.

The depth sensor and its transmitted data allows the tracker to autonomously track and maneuver to a desired depth relative to the target, including above, below or at the same depth as the target. The depth sensor may comprises any, commonly known in the art sensor for depth. In one particular embodiment, the depth sensor comprises a Bar30 depth and pressure sensor commercially available from Blue Robotics.

Tag Imaging System

In some embodiments, as illustrated in FIG. 4, the mini tag further comprises a tag imaging system 40. The tag imaging system enables the tag to capture and record the behavior and perspective of the target, from the target's point of view. The optional tag imaging system is informationally interconnected with at least the electronics package 24 and the communications system 26, and is electrically connected to the power source 28.

In one construction, the tag imaging system comprises at least an electromagnetic radiation sensing device, constructed to capture at least a portion of the electromagnetic spectrum. The tag imaging system may comprise any miniature device capable of detecting electromagnetic waves, for example, but not limited to, a camera for visible or near-visible light, or a ultrasonic range sensor for ultrasonography sonar. Preferred types of electromagnetic radiation sensing for the tag imaging system are similar to the tracker imaging system 66 and are described together below. The tag imaging system provides hitherto unprecedented functionality to a fluid body-immersed tracker.

Electronics Package

The electronics package, also referred to as the electronics module, supports the operational control of the tag. The electronics module supports data handling, processing and storage as required, as well as digital informational communication between the various sensors and the communications system. The electronics module is electrically connected to the power source. In some embodiments, some or all components of the electronics package are located within or substantially within the communications system.

The electronics package 24 comprises a controlling system, herein referred to as the controller 60. The controller may be any digital controlling device as known in the art; in some embodiments, the controller comprises a central processing unit, short-term and long-term memory storage. In other embodiments, the controller comprises a digital signal processing board (DSP) miniaturized by utilizing multilayer board construction, blind vias, and ball-grid components. The electronics package is further defined to include a power source disposed within a defined package or elsewhere.

Target

The inventive tag system 10 may be employed to track any target 14 of interest in aquatic or fluid-body immersed environments. While aquatic animals are the primarily target, the system may be easily adapted to tag and track other object such as a vehicle (possibly in clandestine operations) or other research device such as an AUV, e.g. the Video Plankton Recorder (VPR) (Woods Hole Oceanographic Institution). Target vehicles 14 may include other AUVs, remotely operated vehicles (ROVs), submarine, mini submarine, human-occupied vehicles (HOVs), any drifting object of interest (e.g. floating trash, icebergs, derelicts, and etc.), any similar underwater or fluid-immersed vehicle, and any vehicle partially submerged, for example the underside of a ship. Animals of particularly interest include, but are not limited to, sharks, whales, dolphins, turtles, tortoises, sea lions, seals, fish, porpoises, and the like.

Tracking Vehicle

The system generally comprises a tracking vehicle 16 which serves to follow, communicate, monitor, approach, and track a target marked with the inventive tag. While it is envisioned that many difference vehicles can be used with the disclosed tag, the preferred vehicle comprises several adaptations that provide the novel tracking functionality.

In certain embodiments, the system includes an AUV in communication with a tag. One suitable AUV is the Remote Environmental Monitoring UnitS (REMUS) AUV commercially available from Hydroid Inc., Pocasset Mass., which is well suited to unassisted animal tracking. In addition to collecting imagery, various embodiments of the tracker vehicles are constructed to collect additional physical oceanographic data, such as conductivity, temperature, pressure, and the like, using additional standard, commercially available sensors 46, as known in the art, and described in further detail elsewhere herein. These sensors eliminate the need for alternate and shipboard sampling equipment. The preferred tracker often comprises a custom nosecone 62 which houses the necessary navigation system 64 and some of the tracker imaging mean components, as described herein. Other vehicles may include, but are not limited to, a ROV, a vessel, a glider, a submarine, a mini submarine, and a HOV.

In some embodiments, at least the tracker and remote monitoring vessel send information to the tag, allowing for on-demand commands and mission updates. The information is sent by the tracker's standard transponder or transmitter, as known in the art. Depending on the specific embodiment and the tag's receiving equipment, the information is sent by acoustic or light transmission. The information is received by the tag's communications system and processed by the electronics package. The information may instruct the electronics package to act immediately, or store the information or commands for action at a later point. Actionable information may pertain to any controllable aspect of the specific embodiment in use. For example, the information may instruct the tag's electronic package to at least modify the communication system transmitting frequency, to start or stop the communications system transmission entirely, and to actuate the actuator mechanism.

In some embodiments, the system includes one or more tracking vehicles in communication with one or more tags. A first vehicle and a second vehicle may both be in communication with the tag at the same time, both at least tracking, monitoring and communicating with the tagged target. Similarly, the first and/or second vehicle may be in communication with one or more tags. The first and second vehicle may also be in communication with each other, and may split or duplicate operational parameters, for example imaging from two angles, depths, apogees, or tracking positions, e.g. one tracking from behind while the other approaches or examines for leading vessels, points of interest.

In certain embodiments, the tracker or at least the main hull of the tracker is constructed to make it less visible to the submerged target. For animals, the hull is painted a yellow, green, or blue color depending on the fluid clarity and lighting. In tracking other targets such as vehicles, the tracker may be a uniform color, a set of geometric patterns, or camouflage design, or constructed to absorb or reflect target-based sensors. In further embodiments, the tracker is constructed with rubber foam to reduce target, sonar detection. In other embodiments, the tracker is constructed to reduce drag or eliminate tracker wake.

Tracker Imaging System

In addition to tracking and following the tag in real time, the inventive system produces imaging and video of the tracking via a tracker imaging system 66, herein further referred to as simply the imaging system. The imaging system comprises at least an electromagnetic radiation sensing device, e.g. a camera. The imaging system 66 is typically secured within a fluid-proof and pressure-tolerant housing suited for the depth of use (e.g., 100 m, 200 m, 300 m, 400 m, 500 m, 1000 m, 2000 m, 3000 m, or more). In one embodiment, the system includes an imaging system mechanically and electronically integrated with the vehicle tracking the tag/tagged target capturing, storing the data in the tracker vehicle on a data storage device 68. In other embodiments, the tracker further transmits the data to another source such as a nearby monitoring vessel or land monitoring facility 20. In further embodiments, the imaging system further comprises an imaging system data storage device 70. In these embodiments, the imaging system data storage device is electronically connected to the imaging system and the tracker power source, and transfer of data from the imaging system to the tracker is optional. A given embodiment of the tracker may contain at least one data storage location, or both the tracker data storage device 68 and the imaging system data storage device 70. Suitable imaging system includes systems such as a GoPro® HERO camera or a Gates Camera. In another embodiment, the system uses a multi-aspect HD video camera system.

Figure 10:
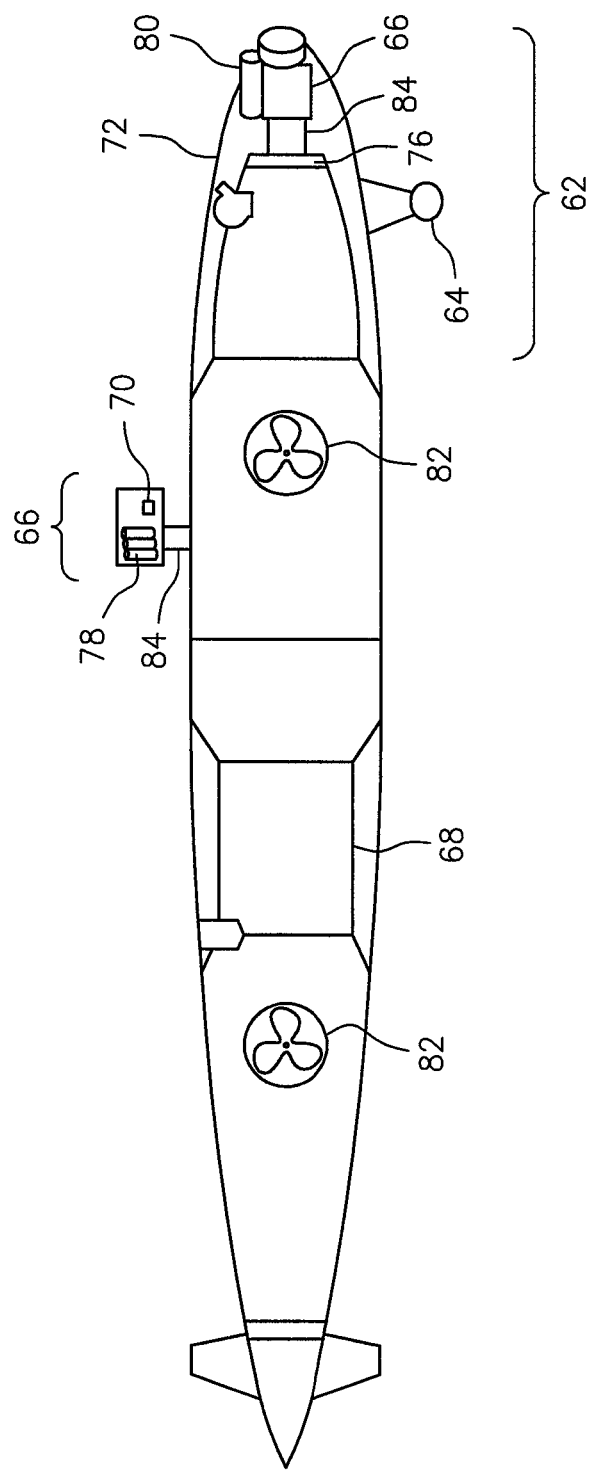
FIG. 10 illustrates a side view of one embodiment of the tracker vehicle.

The Gates camera is a self-contained system with the Canon XA10, Tube 4" diameter×10" length. In preferred embodiments, the vehicle comprise a custom nosecone fairing 72 to support the imaging system in addition to navigation sensors. The nosecone 62 is adapted to support one or more electromagnetic sensors, and in some embodiments up to five sensors. Other embodiments may use up to ten sensors. In some embodiments, a cable assembly 74 connects the imaging system to the tracker front-end cap guest port connector 76, as illustrated in FIG. 10. This cable assembly supplies at least one of power or data communication to the imaging system. In some embodiments, the cable assembly provides both power and data communication and in further embodiments, the imaging system is completely disconnected from the tracker. In some cases, the imaging system further contains its own power source 78, usually a battery pack, so as to not consume vehicle energy. The imaging system may also comprise an electromagnetic emission component 80 (e.g. a flash or lighting element) integrated with the imaging system for illuminating the target as necessary (e.g. night, covered, and deep fluid filming). In some embodiments, the electromagnetic emission component 80 is integrated with the tracker electronics for at least one of power and data communication or with at least one of the imaging system power source 78 and imaging system for data communication.

Other Electromagnetic Wave Sensors

The scope of the present inventive system covers all electromagnetic radiation sensing devices as imaging system in different embodiments. A preferred embodiment described above comprises a camera to record visible light electromagnetic wavelengths (approximately 400 to 700 nm), but the system also enables recording of further electromagnetic radiation, from gamma radiation, through visible light, to radio waves.

Gamma radiation recording is achieved by an adapted gamma-ray spectrometer as available from Pico Envirotec Inc. Infrared recording is achieved in embodiments with GoPro cameras further comprising infrared filters, as available from Back-Bone Gear Inc. Some embodiments comprise an ultraviolet imaging system with a CV-A1 megapix UV camera, available from JAI Ltd.

Tracker Navigation System

In some preferred embodiments, the tracker's inertial navigation system used in many submergible vehicles, and commonly known in the art is replaced or supplemented with an Acoustic Doppler Current Profiler (ADCP) for bottom tracking and bathymetry measurements. ADCPs measure fluid currents by the acoustic Doppler effect, transmitting pings at a constant frequency to measure the distance to the fluid-body floor (bottom tracking) and fluid speed and depth (bathymetry). In some embodiments, the ADCP comprises the SonTek ADP®, available from Xylem Inc. In further embodiments, the tracker vehicle also includes circular ultra-short baseline (USBL) navigation system for locating and three-dimensional tracking of the target.

To further enhance communication with the tag and eliminate blind spots in the plane of the target, some embodiments of the inventive system utilize a horizontal beam pattern from the tracker vehicle, modified from a typical vertical pattern, which is ideal for tracking, particularly in shallower fluid bodies. The improved beam pattern also reduces noise, increases range, and decreases the times the acoustic signal cannot be detected.

Navigation/Control

A key aspect of the present system is the ability to provide adaptive navigation to efficiently follow the unpredictable behavior of the target's dynamics.

On start-up, the tracker vehicle 16 begins its mission using an initial assumption of the target's 14 location. As the tracker navigates towards the specified location, the vehicle then autonomously determines the actual relative location of the target using its on-board navigation system 64 (e.g., USBL acoustic navigation system). This navigation system allows the tracker to accurately estimate range and bearing to the tag communication system attached to the target. Once the vehicle has localized the target, it will then begin to estimate the target's track, course, and speed. Using these continually updating estimates, the vehicle autonomously re-plans its mission path. The path is executed by moving the tracker in discrete angles and speeds. The tracker will engage its propulsion system and steering fins, as commonly known in the art to execute movements, referred to herein as positioning parameters.

Positioning parameters include, but are not limited to, following at a distance (close, at farthest communications range, or at a point in between), leading in front of the target (close, at farthest communications range, or at a point in between), following parallel (including parallel leading, parallel behind, and parallel orthogonal to the direction of movement and the target), approaching the target from any said position, and passing the target from any position to any other position. Positional parameters are combined to orchestrate complex tracker, target-relative maneuvers. Positional parameters can be commanded in a pre-planned, user-defined fashion, as well as autonomously chosen by the tracker.

An example maneuver is for the tracker to approach a target from behind and below, to hold directly below and then to advance to below and in front. Such a maneuver enables the inventive system to get the desired sensor angles as the tracker passes the target, resulting in a maneuver referred to as a "fly-by". The mission may be pre-programmed for the tracker to loop back and repeat the approach multiple times with multiple loop-backs, thus increasing the likelihood of obtaining the desired reading. In some embodiments, the tracker autonomously analyzes data gathered by the imaging system during a maneuver, and executes additional maneuvers to image or sense the target as needed, for example perform fly-bys on different sides or angles relative to the target to develop a complete electromagnetic profile of the target.

During operation, the tracker autonomously determines its proximity to the target, and whether or not it is too close, or not close enough to said target. The tracker autonomously decides if the distance is sub-optimal based on the pre-programmed parameters, and in some embodiments, the past behavior of the target. In cases of too must distance between the target and tracker, the tracker accelerates its speed, or adjust orientation such that it will attain the optimal distance to the target, while remaining undetected by the target, if so desired. However, at close range (e.g., within 10 meters) the vehicle can decrease its speed to stay with the target or it can maintain its speed and do a fly-by, then circle back or decrease speed, in order to get a different point of view of the target. A wide variety of possible approach strategies and dynamic speed versatility is instrumental in maintaining long duration tracking operations. In some embodiments, operators onboard a monitoring vessel 20 are in communication with the tracker and can increase or decrease the tracker's speed or relative location in real time if the tracker-target distance ratio or relative location is not optimal due to any changed behavior of the target or external environment.

While the tracker utilizes the tag's positional information obtained through the communications system to track the target, it is not sufficient to merely go the instant position of the tag. Depending on optimal tracking distance of a given embodiment, the target will have moved to a different location by the time the tracker reaches said location. A key aspect is that this invention takes into account forward predictions of the target's location based on past behavior. However, fly-bys that are executed to the left or right of the target also provide a successful strategy and a different viewpoint.

The tracker vehicle may be adapted for other complex navigational abilities such as highly controlled approach and hovering near or adjacent to the target, such as a slow moving turtle. For these types of operations, some embodiments comprise a tracker with at least one maneuvering system 82. In some embodiments, the maneuvering system comprises a tunnel thruster mounted on the tracker. In further embodiments, the maneuvering system comprises a through hull thrusters, as commonly known in the art, to allow the vehicle to maintain position or move very slowly with stability. The through hull design of the thrusters provides no drag when they are not in use. As a result, the vehicle maintains its ability to move quickly using its normal propeller and fins during transits, but can then slow down or hover as it closes in on the target. Given the known sensitivity of sharks and other aquatic animals to sounds in the 20-1000 Hz range, some embodiments of the tracker minimizes internal shaft noise by cleaning or replacing the main thruster bearings and reducing extraneous motion on the shaft of the thruster between deployments.

It is possible to program the present system to follow and monitor the target for extended periods. In long duration embodiments, the tracker is programmed to, or autonomously decides to occasionally surface and relay position and other data to a remote operator 20 via satellite or other communication method.

In some embodiments, the tracker vehicle 16 comprises a variety of additional sensors (including cameras) 46 such as a 1200 kHz up-down looking ADCP, commercially available from Teledyne RDI, for current data and speed over ground measurements, a standard conductivity-temperature (CT) probe, as available from YSI, magnetic heading sensor or compass, pressure sensor, and six high-definition video cameras, as sold by GoPro, Inc. In a specific embodiment, the imaging system 66 comprises of six sensors, five mounted in a custom tracker nosecone: one facing directly forward, one forward and upward 45 degrees, one forward and downward 45 degrees, one port, one starboard and one sensor mounted in the middle of the tracker, on either the top or bottom of the main pressure housing. In further embodiments, the imaging system comprises the preceding description, plus a sensor facing aft. In further embodiments, imaging system sensors are mounted on movable mounts 84, and controllably connected to the tracker, such that the tracker can autonomously change the direction the imaging system sensor are pointed. Most often the imaging system in the preferred embodiments comprise of cameras for recording visible or infrared electromagnetic radiation. The tracker vehicle may include a sonar system. The imaging system are used to verify successful target imaging, and the sonar system provides additional positional information to determine the distance to the target.

To independently track a target from a small vessel, an acoustic transmitter, for example the V16TP (depth range 0-136 m, 0.6 m resolution; temperature range −5 to 35 degrees Celsius, resolution 0.15 degrees Celsius) or V16T (temperature range 10-40 degrees Celsius, resolution 0.12 degrees Celsius) from Vemco Inc. is affixed in some embodiments to the transponder. The acoustic transmitter is detected with a directional hydrophone, Model VH110 from Vemco Inc. connected to an acoustic receiver, for example Vemco's Model VR100. Depth and ambient temperature data are telemetered to the tracker's receiver and recorded therein.

The present invention may optionally be further utilized concurrently with a remote monitoring vessel's tracking system 21 which, in some embodiments provides depth, range, and bearing tracking of the tag and the tracker independently. These data are displayed in any suitable format and device, as commonly known in the art, and provides the operators on said remote monitoring vessel 20 with knowledge of both the tag and the tracker at all times. Additionally, when the tracker vehicle is at the surface or out of the fluid body for any reason (e.g. maintenance, data downloads, battery charging, or vehicle recovery), the monitoring vessel's tracking system will maintain positional information of or communication with the tag. Monitoring vessel's tracking systems generally comprise, but are not limited to, a digital signal board (DSP), also referred to as a digital transponder board, a circular navigation board (e.g., circular USBL navigation), a magnetic compass, and a modem. One or more transducers are also employed for receiving range and bearing. The present inventive system is able to solve for range and bearing no matter what the orientation of the target (and therefore the tag). An internal wiring harness is also used for the shipboard tracking system.

Real-time transmissions of depth and position data allow the operators to offset the tracker vehicle's depth above or below the depth of the target while the mission is underway. When the target is located near the fluid body's bottom, the tracker's on-board altimeter may be used to maintain a minimum range of 0.5, 1, 2, or more meters above the sea floor. In addition, the distance to the fluid body's floor may be programmatically set by the remote user beforehand, or in real-time. Real-time data also provides vital status updates on the tracker's performance. This includes, but is not limited to, tracker vehicle altitude, attitude (pitch, roll and heading rate), range to target and remote monitoring vessel, tracker vehicle and target depth, velocity, voltage levels, tracker and tag power source levels, and other tracker and target system diagnostics. The age of each USBL fix is also recorded, and optionally sent to the user, and provides a baseline for how well the vehicle was tracking the target.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

Example 1

In one embodiment of the present invention, the system as constructed is detailed in Table 1 below and compared to the currently available tags (Prior Art column). In addition to the tag specifications, the tracker has the capability to track, monitor, and follow the tag. Enabling tracker's abilities is accomplished by real-time customizable computer code. The code defines many of the settings for the positional parameters or movements the tracker will undertake. The code is pre-loaded on to the tracker's systems before an operation, but may optionally also be updated by the user in real-time during a mission or operation.

TABLE 1

| | Prior Art | Present Invention |
|---|---|---|
| Housing Depth Rating | 150 m | At least 300 m |
| Imaging Capacity | none | 5 or more cameras |
| Transponder | 70 kHz | 25 kHz |
| Target | Sharks | Marine animals |
| Size | 3.25" × 14.85" | 2" × 5" |
| Vehicle Capacity | Single vehicle | Multiple vehicles |
| Release Method | Burn wire | Multi-tiered release based on command, depth rating, and/or time |
| Tag Attachment | Tether only | Multiple mounts dependent upon target of interest |

The settings and options for one embodiment are presented in Table 2 below, are to be understood as important settings for one particular use of the present invention and not to be limiting in any way. In other examples, and other embodiments many additional settings and their corresponding options may be added or removed as needed. Furthermore, the options for each setting may be added or subtracted to as needed. All settings options can be updated in real-time, remotely and in some cases, the user may remotely send additional information to the tracker for updated computer code to interpret and execute new options or new settings, as needed.

TABLE 2

| Setting | Option |
|---|---|
| Type | Follow |
| Destination | Shark |
| Transponder to follow | Shark |
| Offset target to starboard | 0.0 |
| Speed (near) | 2.3 meter/second |
| Speed (far) | 2 meter/second |
| Depth control | 6 meter/second |
| Minimal altitude | 1 meter |
| Auto depth | Yes |
| Instrument setup name | Transit |
| Minutes to follow | 480 minutes |
| Minutes between GPS fixes | 240 minutes |
| Minimum range to target for GPS fix | 25 meters |
| Turn around distance | 10 meters |
| Depth below transponder | 0.0 meters |
| Auto speed | Yes |
| Minimum depth auto | 2.5 meters |
| Send depth to tag | Yes |
| Send release command position | No |
| Send release command time | No |
| Send release command depth | 135 meters |

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims Appended hereto. Other embodiments will occur to those skilled in the art and are within the following claims.

What is claimed is:

1. A submersible tag device configured to operate within a liquid medium, comprising:
a liquid-tight housing defining a chamber that remains isolated from the liquid medium when the housing is immersed in the liquid medium;
an attachment mechanism configured to attach to a target selected by a user; and
a communication module disposed in the chamber, the module including a receiver, a controller configured to receive input from the receiver, a power source operatively connected to at least the controller, and data storage;
wherein the attachment mechanism includes an actuator mechanism having a release mechanism, responsive to a communication from the controller, configured to mechanically release the tag device from the target; and
wherein, when the tag device is immersed in the liquid medium, the receiver is configured to receive a command signal through the liquid medium.

2. The tag device of claim 1 wherein the communication module further includes a transmitter configured to transmit a data signal through the liquid medium, and the controller is also configured to provide output to the transmitter.

3. The tag device of claim 1 wherein the release mechanism is configured to mechanically release the tag device from the target when a release command signal is received by the receiver.

4. The tag device of claim 1 further including an imaging system.

5. The tag device of claim 1 further including a locator system to assist recovery of the tag device when proximate to an upper surface of the liquid medium.

6. The tag device of claim 1 further including a buoyancy compensation mechanism.

7. The tag device of claim 1 wherein the attachment mechanism includes at least one of an intramuscular mount, an external mount, or bracket mount.

8. The tag device of claim 1 wherein the communication frequency range is approximately 10 kHz to 100 kHz.

9. The tag device of claim 1 wherein the controller is configured with a plurality of mechanical release parameters including being responsive to at least two of (i) an external release command, (ii) a not-to-exceed depth, (iii) a low-power indication, or (iv) a timed release.

10. A system for locating a target on or in a liquid medium, comprising:
at least a first vehicle configured to travel autonomously on or in the liquid medium and configured to send at least one command signal and to receive data signals; and
a submersible tag device including (i) a liquid-tight housing defining a chamber that remains isolated from the liquid medium when the housing is immersed in the liquid medium, (ii) an attachment mechanism configured to attach to a target selected by a user, and (iii) a communication module disposed in the chamber, the module including a receiver, a controller configured to receive input from the receiver, a power source operatively connected to at least the controller, and data storage;
wherein, when the tag device is immersed in the liquid medium, the receiver is configured to receive the at least one command signal through the liquid medium and the at least first vehicle is configured to autonomously track three-dimensionally and follow the submersible tag device.

11. The system of claim 10 wherein the communication module further includes a transmitter configured to transmit a data signal through the liquid medium, and the controller is also configured to provide output to the transmitter.

12. The system of claim 10 further comprising at least a second vehicle in communication with the tag device.

13. The system of claim 12 wherein the second vehicle is selected from the group comprising an autonomous underwater vehicle, a remotely operated vehicle, a vessel, a glider, a submarine, a mini submarine, and a human-occupied vehicle.

14. The system of claim 11 wherein the system is adapted to operate at depth greater than 100 meters.

15. The system of claim 11 wherein the attachment mechanism includes a multi-tiered release capability including at least one of a command-initiated release, a depth-dependent release, a timed-based release, or a power level-based release.

16. The system of claim 11 wherein at least the first vehicle is capable of three-dimensional autonomous tracking, following within the liquid medium, and close distance recording of the target.

17. A method of three-dimensional autonomous tracking and following of a movable target on or in a liquid medium, the method comprising:
selecting at least a first tracking vehicle configured to travel autonomously on or in the liquid medium and configured to send at least one command signal;
selecting at least one submersible tag device including (i) a liquid-tight housing defining a chamber that remains isolated from the liquid medium when the housing is immersed in the liquid medium, (ii) an attachment mechanism configured to attach to a target selected by a user, and (iii) a communication module disposed in the chamber, the module including a receiver, a controller configured to receive input from the receiver, a power source operatively connected to at least the controller, and data storage;
securing the tag device to the target utilizing the attachment mechanism to achieve a tagged target;
utilizing the first tracking vehicle to autonomously track the submersible tag device in three dimensions of movement after attachment to the target and to follow the tagged target; and
receiving at least one command signal through the liquid medium from the tracking vehicle to the tag device to alter a condition of the tag device.

18. The method of claim 17 further including utilizing the tracking vehicle to maintain at least real-time locational information of the tagged target.

19. The method of claim 17 further including employing one or more approach strategies to monitor the tagged target.

20. The method of claim 17 further including positioning the tracking vehicle at a depth that is not the same as depth of the tagged target.

21. The method of claim 17 wherein the communication module further includes a transmitter, the controller is also configured to provide output to the transmitter, and further including transmitting data signals from the tag device through the liquid medium to at least one of the tracking vehicle, a surface vessel, an aerial drone, and a satellite.

22. The method of claim 17 wherein the attachment mechanism includes a multi-tiered release capability including at least one of a command-initiated release, a depth-dependent release, a timed-based release, or a power level-based release.

23. A submersible tag device configured to operate within a liquid medium, comprising:
a liquid-tight housing defining a chamber that remains isolated from the liquid medium when the housing is immersed in the liquid medium;
an attachment mechanism configured to attach to a target selected by a user; and
a communication module disposed in the chamber, the module including a receiver, a transmitter, a controller configured to receive input from the receiver and provide output to the transmitter, a power source operatively connected to at least the controller, and data storage;
wherein, when the tag device is immersed in the liquid medium, the receiver is configured to receive at least one first signal through the liquid medium at a receiving frequency and provide said at least one first signal to the controller, and the transmitter is configured to transmit at least one second signal through the liquid medium at a transmitting frequency; and
wherein the controller is configured to change at least one of the receiving frequency or the transmission frequency in response to the at least one first signal.

24. The tag device of claim 23 further comprising a depth sensor informationally connected to the controller, wherein said at least one second signal encodes depth-telemetered information and enables following of the tag device.

* * * * *

UNITED STATES PATENT AND TRADEMARK OFFICE
CERTIFICATE OF CORRECTION

| | |
|---|---|
| PATENT NO. | : 10,303,995 B2 |
| APPLICATION NO. | : 15/707900 |
| DATED | : May 28, 2019 |
| INVENTOR(S) | : Amy L. Kukulya et al. |

It is certified that error appears in the above-identified patent and that said Letters Patent is hereby corrected as shown below:

On the Title Page

The listing of Inventors should include: --Robin Hunter Littlefield, Falmouth, MA (US)--

Signed and Sealed this
Nineteenth Day of November, 2019

Andrei Iancu
*Director of the United States Patent and Trademark Office*